United States Patent [19]

Cousino

[11] 3,996,617
[45] Dec. 7, 1976

[54] TAPE CARTRIDGE CHANGER APPARATUS

[75] Inventor: Bernard A. Cousino, Fort Myers, Fla.

[73] Assignee: Cousino Corporation, Fort Myers, Fla.

[22] Filed: Apr. 16, 1975

[21] Appl. No.: 568,787

[52] U.S. Cl. ............................................... 360/92
[51] Int. Cl.² ...................................... G11B 15/68
[58] Field of Search ..................................... 360/92

[56] References Cited
UNITED STATES PATENTS

| | | | |
|---|---|---|---|
| 3,504,916 | 4/1970 | Ban ..................................... | 360/92 |
| 3,522,594 | 8/1970 | Gabor et al. ......................... | 360/92 |
| 3,682,483 | 8/1972 | White ................................... | 360/92 |
| 3,852,819 | 12/1974 | Staar .................................... | 360/92 |
| 3,860,964 | 1/1975 | Kozv et al. ........................... | 360/92 |

*Primary Examiner*—Robert S. Tupper
*Attorney, Agent, or Firm*—Richard D. Emch

[57] ABSTRACT

A changer for tape cartridges is disclosed. A number of tape cartridges are held in stacked but separated fashion in a storage unit which is slidable with respect to a tape player unit. The changer includes an advancing mechanism capable of advancing the storage unit in either direction one cartridge at a time, the total number of positions available being equal to the number of cartridges within the storage unit. In each position, one of the cartridges is adjacent the head and drive capstan of the player unit. Such cartridge may be pushed into the player unit by a cartridge lifter unit. The cartridge is then engaged by the player head and drive capstan. When the entire tape or a desired segment has been played, a signal from the tape activates a release mechanism to release the tape cartridge from the head and drive capstan assembly, thereby replacing the cartridge back into the appropriate position in the storage unit. Then a solenoid operates the advancing mechanism to move the storage unit into position for playing the next adjacent or selected cartridge. When the last tape cartridge of the row of cartridges in the storage unit has been played, a signal is sent from a limit switch to shut off or reverse the cartridge storage unit advancing mechanism. Where a reversing signal is sent, the player continuously and repeatedly plays the series of tape cartridges cartridge-by-cartridge, by moving the storage unit first in one direction, then in the opposition direction, and so on.

11 Claims, 7 Drawing Figures

TAPE CARTRIDGE CHANGER APPARATUS

BACKGROUND OF THE INVENTION

The invention relates to sound recordings, and more particularly to a changing apparatus capable of automatically advancing and admitting successive tape cartridges to a tape player.

Either continuous endless loop tape cartridges or reel-to-reel tape cartridges can be used in the changing apparatus. Endless loop tape cartridges are well known and do not form the subject matter of the present invention. Such cartridges, whether standard 8-track size cartridges such as presently used in automobile players or miniaturized tape loop cartridges, normally consist of a housing having a rotatable tape storage disc mounted therein. A coil of tape within the housing forms a continuous loop and is guided across openings near one end of the cartridge. Normally one opening receives the tape player drive capstan while another opening directs the tape across the magnetic head of the player mechanism.

Normally, in prior art apparatus, endless loop tape cartridges are inserted into and retrieved from player units by hand. The player unit has means for receiving the tape cartridge such that the cartridge need only be pushed into position in the player to be engaged by the head and drive capstan of the player. In miniaturized endless loop tape cartridges, the advancing tape is usually oriented parallel to the general plane of the cartridge, with no pressure roller included in the cartridge for holding the tape against the drive capstan. The pressure roller is usually included in the player unit for such miniaturized cartridges with the player unit being adapted to receive the tape between the drive capstan and the pressure roller. The drive capstan and pressure roller converge together with the tape engaged therebetween.

However, the changer apparatus of the present invention, in one embodiment, may also utilize cartridges which have a built-in pressure roller.

There is a need for a compact, quickly functioning automatic tape cartridge changer capable of selectively inserting a tape cartridge from a number of stored cartridges into a tape player or recorder mechanism, then returning the cartridge to the storage area after its tape has played or recorded; in response to a signal from an operator or a pre-programmed control unit. Whether the cartridges contain recorded music, computer data or audio communications, it is desirable to have some means of quick, selective retrieval and playing of cartridges from a number of stored cartridges of various content.

SUMMARY OF THE INVENTION

The present invention provides a cartridge tape storing and changing unit which is compact and efficient, requiring a minimum of apparatus for accomplishing its function of inserting tape cartridges into a player, ejecting the cartridges from the player and shifting the position of a cartridge storing unit to place the appropriate tape cartridge in the position for playing. The changer may be designed to cartridges handle standard 8-track tape continuous loop cartridges, but is more preferably used with 4-track miniaturized continuous loop cartridges of the type shown in U.S. Pat. Nos. 3,420,461 and 3,829,033. The latter patent also discloses a tape player mechanism of the type which is preferably employed in conjunction with the present invention. When the word "player" is used, such word includes a playback function, an erase function, a record function or any combination thereof.

The cartridge changing apparatus includes means for advancing a storage unit containing a bank of tape cartridges in either direction for proper positioning adjacent the entrance to a tape player preferably disposed above the tapes, a means for lifting the appropriate cartridge from the storage unit into the player, and a means for ejecting the cartridge to lower it back into the storage unit after it has played or been rejected. In addition, the changer includes sensing means for determining when the last cartridge in a row of stored cartridges has played and for either stopping or reversing the direction of advancement of the storage unit such that the entire bank of tape cartridges is again played in the reverse order. The changer of the invention may additionally include an electronic device for sensing the position of the storage unit at any time and a selector for choosing a particular tape to be played, for example, by selecting a reference numeral keyed to the desired tape. In response to a selection of a particular tape, the storage unit is advanced until the appropriate position is sensed, at which point the desired tape is inserted into the player. In other embodiments, the sensing means stops a first changer and energizes any one of a plurality of like changers, for the selective playing of a specific tape cartridge in the tandem bank of changers.

Because of the simplicity and compact design of the present apparatus, a plurality of such changer apparatus saves approximately sixty to eighty percent of the space requirements of prior art apparatus, such as spot announcement machines used in broadcasting. In addition, additional space is saved because the present miniature cartridges are stored in machine mounted storage units as opposed to tape storage racks. The cartridges may be pre-programmed for selective playing of individual spot announcements or the like. In addition, the present machines may be provided with remote erase and record capabilities, enabling individual spot announcements, or the like, to be erased and re-recorded.

The present apparatus also lends itself to the storage of educational material and data in university storage banks, medical storage banks, legal storage banks and the like. These banks may be called upon remotely by a user to obtain individual increments of information from the respective banks.

All of the mechanical functions of the tape cartridge changer of the invention are accomplished by motor means, for example, solenoids or the like. One solenoid operates apparatus which incrementally advances the cartridge storing unit by one cartridge position at a time; this advancing apparatus is shown and more fully disclosed in my copending application Ser. No. 441,327, now U.S. Pat. No. 3,879,694, filed Feb. 11, 1974. Another solenoid operates a cartridge lifting apparatus which lifts and inserts a cartridge into the player, and a third solenoid cooperates with the player mechanism to eject the cartridge therefrom after it has played as desired and drop it down into the cartridge storing unit.

It will be seen that the tape cartridge changer apparatus of the invention is compact in size and very efficient in operation due to the structure and operation of components included in the apparatus. The unit may be placed, as mentioned above, in a remote location from the operator, with controls for the unit located near the operator, or the unit may be automatically programmed, whereby manual acts by an operator are not required. For example, the unit may be located in the trunk of an automobile.

DESCRIPTION OF THE PREFERRED EMBODIMENT

Figure 1:
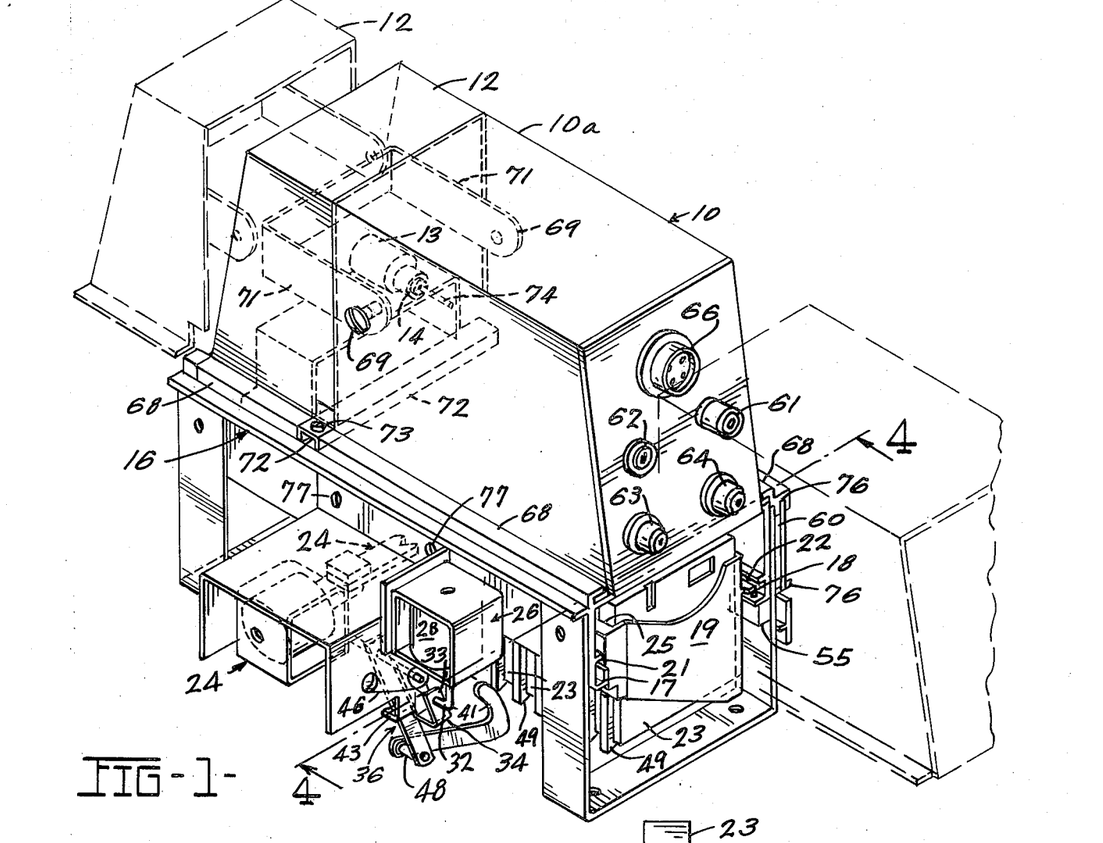
FIG. 1 is a perspective view of a tape cartridge changer apparatus according to the invention.
Figures 4, 5:
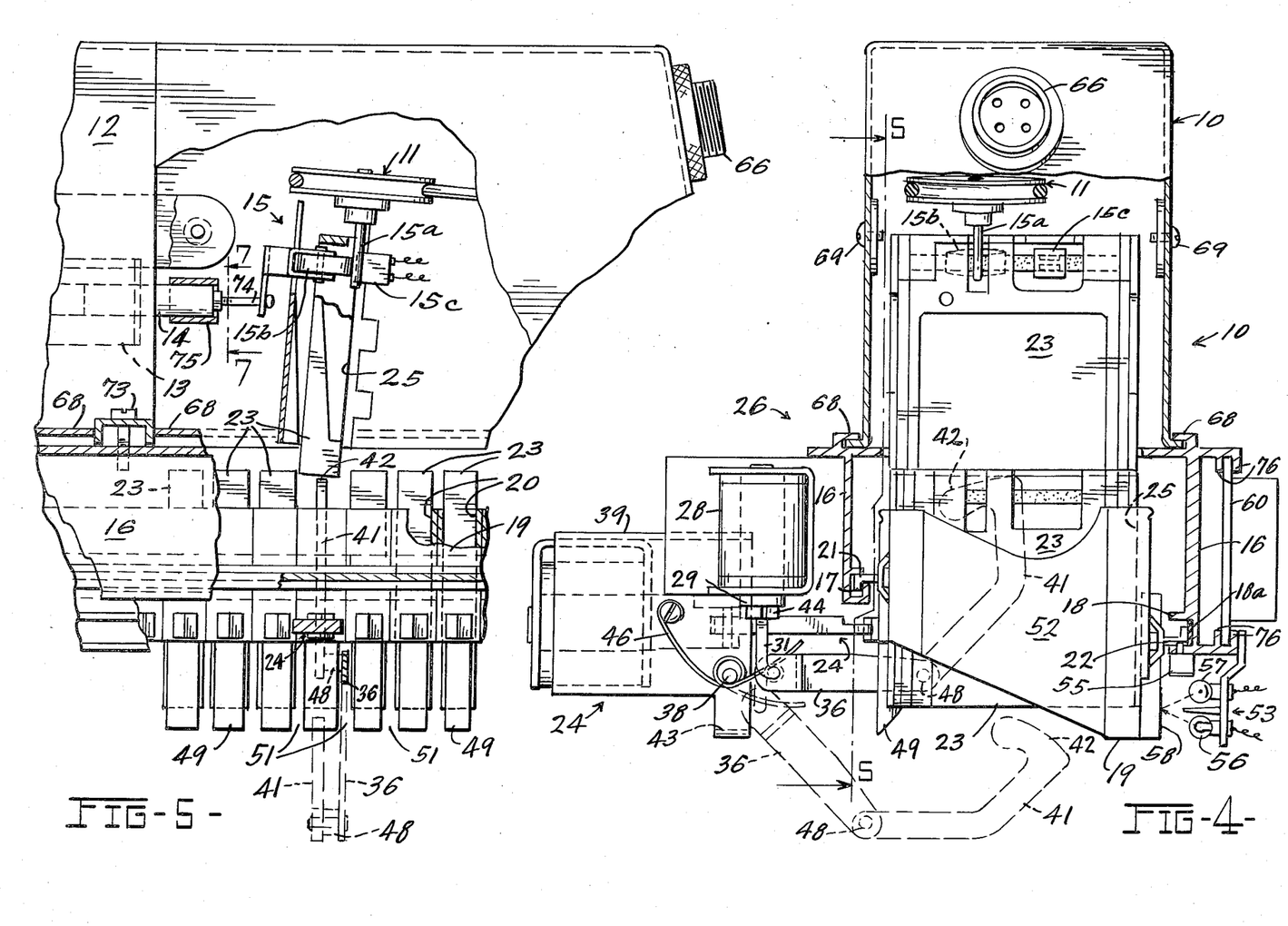
FIG. 4 is an enlarged sectional view taken along the line 4—4 of FIG. 1.
FIG. 5 is a partially cutaway elevational view taken along the line 5—5 of FIG. 4.

In the drawings, FIG. 1 shows a tape cartridge playing and changing assembly generally indicated by the reference number 10. The assembly 10 includes a modular housing 10a which contains a player unit 11 (see FIG. 5) which is well known in the endless magnetic tape art and which does not form a part of the present invention. The player 11 is preferably of the type shown in my U.S. Pat. No. 3,829,033, designed to receive and play miniaturized tape cartridges of the type shown therein. Connected adjacent the player unit 11 is a control unit 12 which includes a solenoid 13. A reciprocable plunger 14 of the solenoid 13 is connected to a mechanism of the player unit 11 which releases a tape cartridge from the head, drive capstan and pressure roller of the player when pulled by the plunger 14, allowing the tape cartridge to drop downwardly from the cartridge receiving area of the player unit. FIG. 5 shows the solenoid plunger 14 connected to a release mechanism 15, with a drive capstan 15a, a pressure roller 15b and a magnetic head 15c also illustrated. The solenoid 13 is operably connected to sensor and actuator means which energize it at the appropriate time, as will be seen below.

Connected to the player housing 10a and the control unit 12 is a frame 16 including tracks 17 and 18 on which a tape cartridge storage unit 19 is slidable (see FIGS. 1 and 5). A resilient layer 18a, preferably constructed of "Teflon" is applied at the back surface of the track 18. The layer 18a both reduces friction and serves as a thrust cushion for the storage unit 19. The storage unit 19 includes a plurality of cartridge storage cells 20. Except for projections 21 and 22 for engagement with the tracks 17 and 18 of the frame 16, the storage unit 19 is preferably as shown in FIG. 1 of my copending application Ser. No. 414,372, now U.S. Pat. No. 3,835,670, filed Nov. 9, 1973. Tape cartridges 23 retained by the storage unit 19 are matched to the tape player 11 and are of the type shown in my U.S. Pat. No. 3,829,033, referenced above in connection with the tape player unit 11. The continuous loop tapes of the miniature tape cartridges 23, in the present embodiment, each have four sound tracks forming two stereo programs. However, various pluralities of tracks, either monaural, stereo or quadrasonic, may be utilized in connection with the changer apparatus 10, according to the present invention. As the tape is driven through one loop, the first stereo program plays, then a signal from the tape energizes other track portions of the receiving head 15c of the player 11, and the second stereo program plays while the tape is driven through another entire loop. When the tape reaches the end of the second program, the first cartridge is rejected and another cartridge is activated. The total duration of a single cartridge, in the present embodiment, is about 30 minutes.

The tape cartridge storage unit 19 is capable of assuming the same number of positions as the number of tape cartridges it holds. In any such position, one of the cartridges 23 is aligned with the cartridge receiving area, comprising a slot 25, of the tape player 11 (see FIG. 5).

Also included on the assembly 10 and connected to the frame 16 are a storage unit advancing mechanism 24 and a tape cartridge lifting mechanism 26 (see FIG. 4). The advancing mechanism 24, which uses a second solenoid-actuated apparatus to incrementally advance the storage unit 19 in either direction in response to the appropriate signal, is as shown and described in Cousino et al copending application Ser. No. 441,327. The resilient layer 18a, in the track 18, serves as a thrust member as force is applied to the storage unit 19 by the advancing mechanism 24. The cartridge lifting mechanism 26, to be described in detail below, is operable to lift one of the cartridges 23 into the cartridge receiving area of the player 11 after the cartridge storing unit 19 has reached the appropriate position.

FIGS. 2, 3, 4 and 5 illustrate the lifter mechanism 26. The mechanism 26 includes a vertically disposed solenoid 28 having a downwardly depending plunger 29 connected to a linkage rod 31 which includes a 90° bend 32. The linkage rod 31 passes through a hole 33 (see FIG. 2) in a flange 34 of a pivoted lifting arm 36. As FIG. 3 indicates, the linkage rod 31 includes a flared end 37 which prevents its disengagement from the hole 33. The lifting arm 36 is pivoted on a horizontal shaft 38 supported by a housing section 39 connected to the frame 16.

Figure 2:
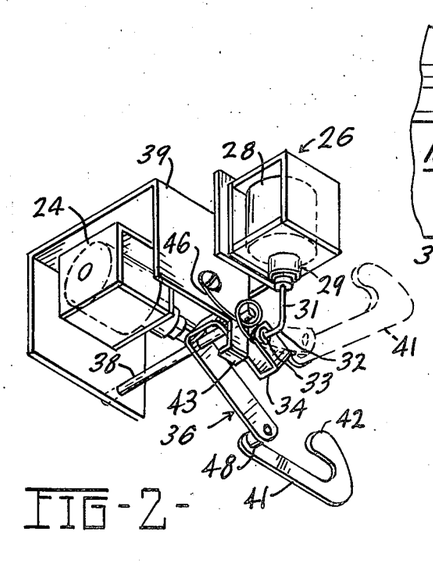
FIG. 2 is a perspective view of a cartridge lifting mechanism and an advancing mechanism which form a part of the changer apparatus of FIG. 1.

As the solenoid 28 pulls the plunger 29 and linkage rod 31 upwardly, the flange 34 of the lifting arm 36 is brought upwardly in an arcuate path, causing a hook-shaped lifting finger 41, at an offset position on the lifting arm 36 from the flange 34, to be likewise brought upward in an arcuate path as indicated in FIGS. 2 and 4. As shown in FIG. 4, this lifting finger 41 has a curved end 42 which is shaped so that, in lifting a tape cartridge 23 into the player unit 11, the end 42 of the lifting finger is constantly in contact with the approximate center of the cartridge bottom. This provides for a uniform lifting action and avoids jamming of the cartridge 23 as it enters the receiving slot 25 of the player 11.

As stated above, the flange 34 of the lifter arm 36 follows an arcuate path as it is pulled upwardly by the linkage rod 31 connected to the solenoid plunger 29. Since the plunger 29 and linkage rod 31 follow a linear up and down stroke without allowance for the arcuate path of the flange 34, means must be provided for absorbing this difference in motion. This is accomplished by the ability of the plunger 29 and linkage rod 31 to rotate during their upward and downward movement. As the linkage rod 31 moves up or down, it is caused by the flange 34, acting adjacent the flared end 37 of the linkage rod, to rotate so that the point on the rod 31 which is in contact with the flange 34 follows the same arcuate path as the hole 33 in the flange 34. That is, as the rod 31 moves upwardly, the portion of the rod 31 below the bend 32 rotates from a position in general alignment with the shaft 38 to an angled position shown in dashed lines in FIG. 3 and in solid lines in FIG. 4.

The linkage rod 31 of the lifter mechanism 26 is screwed into the reciprocable plunger 29 by threaded connection, and the relative axial positions of the plunger and linkage rod can be adjusted by relative rotation. Thus, the plunger 29 may be rotated on the stationary control rod 31 to cause more or less of the control rod to extend out of the plunger. This assures that the solenoid plunger 29 is in the proper position within the solenoid 28 for maximum efficiency in powering the lifting arm 36 and in adjusting the vertical travel of the lifting finger 41. A tightening nut 44 on the threaded linkage rod 31 prevents relative rotation of the plunger 29 in the rod 31 after the proper setting has been provided. A hole 45 may be included through or into the plunger 29 for insertion of a holding pin to prevent rotation of the plunger during tightening of the nut 44. The bottom position of the lifter arm 36 is not controlled by the linkage rod 31; instead, a stop 43 (see FIG. 3) extending from the housing portion 39 defines the lowermost position of the lifter arm 36 and finger 41.

Figure 3:
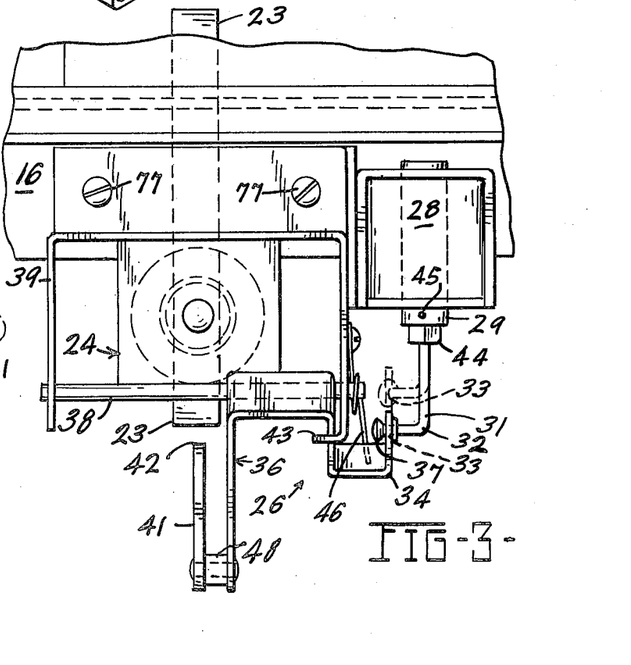
FIG. 3 is an enlarged elevational view of the apparatus of FIG. 2.

A wire spring 46 extends from the housing portion 39 to lightly flex against the top of the flange 34 as shown in FIGS. 2, 3 and 4. This prevents interfering motion, before actuation of the lifting finger 41 by the solenoid 28, which might result from jarring while in use, for example, in vehicles such as automobiles or airplanes.

As FIGS. 2, 3 and 5 indicate, the lifting finger 41 of the lifting arm 36 is offset a considerable distance from the flange 34 from which it is lifted by the linkage rod 31. The reason for this offset is that the contacting end 42 of the lifting finger 41 is positioned to meet the bottom center of a tape cartridge 23 positioned directly below the cartridge-receiving slot 25 of the player 11, when the lifting mechanism 26 is activated. However, the advancing mechanism 24 is also positioned to act on the storage unit 19 adjacent the same tape cartridge 23. This positioning of the advancing mechanism 24 is desirable so that the storage unit 19 need not be unnecessarily long. That is, when the unit 19 is in position for the last tape cartridge 23 at either end to be played, the advancing mechanism 24 is able to act directly adjacent that last tape cartridge, whereas, if the position of the advancing mechanism 24 were, say, moved to the left as shown in FIGS. 1, 2 and 3, additional contacting points for cooperation with the advancing mechanism 24 would obviously be required to extend from the left end of the storage unit 19 in order that all of the tape cartridges 23 might be played. The lifting arm 36 has a rigid offset connection 48 which is properly sized and positioned within the lifting arm 36 such that no part of the lifting arm 36 strikes the tape cartridge storage unit 19 as the finger 41 moves upwardly to lift a tape cartridge 23 into the player 11. As shown in FIG. 5, flexible retaining clips or fingers 49 on the storage unit 19 define spaces 51 therebetween through which the upper portion of the lifting arm 36 passes as it travels upwardly. The offset connection 48 is positioned to avoid contact with wall panels 52 between successive tape cartridge storage areas in the storage unit 19. As shown in FIG. 4, the offset connection 48 remains below the partitions 52. The remaining offset from the lifting finger 41 to the flange 34 of the lifting arm 36 is provided by the shape of the lifting arm 36, which is best seen in FIG. 3.

Figure 6:
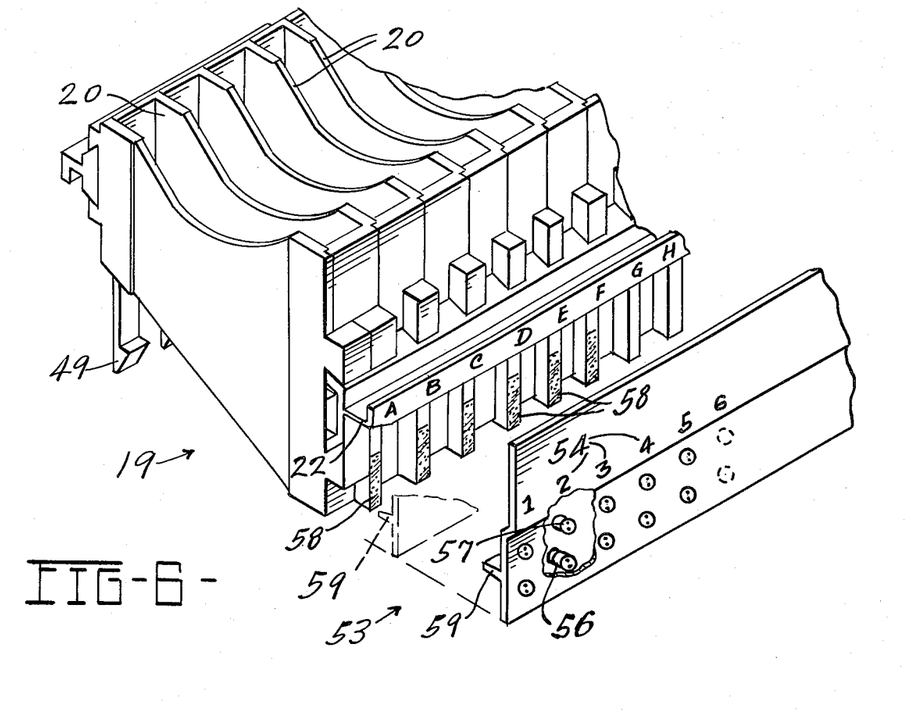
FIG. 6 is a fragmentary perspective view of a position sensing apparatus which, in one embodiment, forms a part of the changer apparatus.

FIGS. 4 and 6 show a portion of a storage unit position reading apparatus 53, according to the invention. The reading apparatus 53 includes a plurality of stations 54, each being adjacent to a cartridge storage cell 20 of the storage unit 19. Each station 54 includes a lamp 56 which may be a light-emitting diode, and a photoelectric cell 57. In the alternative, a single unit which includes both an emitter and a receiver may be utilized. Adjacent each cartridge storing area on the storage unit 19 is a strip of reflective material 58 which may comprise reflective mylar. Each lamp 56 emits light which, if there is a reflective strip 58 positioned adjacent the lamp, is reflected off the strip 58 and read by the photoelectric cell 57. A baffle flange 59 extends between the lamps 54 and the photoelectric cells 57 to prevent light from the lamps from reaching the photoelectric cells in the absence of adjacent reflective strips 58. Thus, the photoelectric cell 57 at each station 54 reads one of two conditions: the presence or the absence of a strip of reflective material 58 adjacent the involved station 54. Appropriate circuitry, known in the art, for interpreting the sensed conditions discussed below also comprises a part of the position reading apparatus 53.

The position reading apparatus 53 may be included in the apparatus 10 to provide for the selection of a particular tape cartridge 23 from the storage unit 19 at any time. If the apparatus 53 is included, a selector device (not shown), such as a dial having a set of identification numerals corresponding to the storage cells 20 of the unit 19, is included on the apparatus 10 for making the desired selection. Means (not shown) operably connected to the selector device and also to the advancing mechanism 24 and the position reading apparatus 53 for correlating the functions of these components is also provided. When the selector device has been appropriately set and the system has been activated, circuitry included in a circuit board 60, indicated in FIG. 1, advances the cartridge storage unit 19, one cell at a time, until the desired position is reached. When the unit 19 reaches its maximum position in one direction, limit switches 55 (see FIG. 1), which the unit 19 trips, are appropriately connected to reverse the advancing mechanism 24. For fast retrieval of the desired tape cartridge 23, appropriate circuitry (not shown) may be included and connected to the selector device, the position reading apparatus 53 and the advancing mechanism 24 to first take a reading of the position of the unit 19, then read the setting of the selector knob, and from this information instruct the advancing mechanism 24 as to which direction it should advance in order to reach the desired position.

The position reading apparatus 53 operates by reading the array of lighted and unlighted photocells. That is, using information as to which photocells are lighted and which are not, the apparatus 53 makes a determination as to what the position of the storage unit 19 is, or as to when the desired position is reached. If there are, say, ten storage cells 20, each having an adjacent strip of reflective material 58, and ten reading stations 54 positioned alongside the reflective strips 58, one of which stations is at the position of the tape player slot 25, then there would be one position of the unit 19 wherein all of the photocells 57 are lighted, and nine other positions wherein cells toward one end are lighted and cells toward the other end are unlighted. The circuitry connected to the photocells 57 determine from the lighted and unlighted photocell array the position of the storage unit 19.

Depending upon the position of the cartridge receiving slot 25 of the tape player 11, a smaller number of reading stations 54 and reflective strips 58 and a smaller number of storage cells 20 in the unit 19 may be provided. For example, if the reading stations 54 are numbered and the storage cells 20 are lettered as indicated in FIG. 6, assume that the position of the cartridge-receiving slot 25 of the tape player 11 corresponds to the position numbered 5 among the reading stations 54. Though not all the units 20 are shown, assume that there are ten units lettered A through J. In this case, there need only be six reading stations 54, at positions 1 through 6 as shown in FIG. 6. Six positions A through F on the unit 19 may also be provided, although only five are needed if properly positioned. The five cells having reflective strips 58 would be B through F. At its maximum position to the left, the storage unit 19 would have its rightmost cell, represented by the letter J, at the station 5 which corresponds to the position of the cartridge-receiving slot 25 of the tape player 11. Thus, the reflective cell F would be positioned adjacent to the reading station numbered 1. The resulting array would be station number 1 lighted, stations 2 through 6 unlighted, and the array would be interpreted to identify the described position. As the unit 19 is moved to the right, each position is identifiable by different combinations of lighted and unlighted photocells 57 at the reading stations 1 through 6. At least one photocell is always lighted, and there are no two positions wherein the same combination of photocells is lighted. In the maximum position of the storage unit 19 to the right, the storage cell A would be adjacent the reading station 5, and the photocell of the reading station 6 would be lighted by reflection from the reflective storage cell B. Of course, if the storage cell A is reflective as shown in FIG. 6, then the photocell at station 5 would also be lighted. In either case, the position is identifiable.

It should also be understood that the reading station 54 numbered 6 in FIG. 6 can be eliminated, still assuming that the cartridge-receiving slot 25 of the tape player 11 corresponds to the station numbered 5. Either the storage cell A or the storage cell F must be nonreflective, so that there are a total of five reflective storage cells and five reading stations. In this five-station mode of the position reading apparatus 53, there will be one position wherein none of the photocells 57 of the reading stations 1 through 5 will be lighted. If the storage cell A is the nonreflective storage cell, then the condition just described will occur in the maximum right position of the storage unit 19, or when the storage cell A is adjacent the station numbered 5. If the storage cell F is the nonreflective cell, then the condition will exist when the unit 19 is in its maximum position to the left, or when the tape storage cell J is adjacent the reading station numbered 5. Thus, only one position of the storage unit 19 will result in all five photocells being unlighted, and this condition is read by the program circuitry.

In operation of the tape cartridge playing and changing assembly 10, referring first to FIG. 1, the unit is first energized by connection to an appropriate power supply. Volume may be adjusted by rotation of a control knob 61. Headphones and/or speakers are connected to jacks 62, 63 and 64. As mentioned above, the controls for the unit 10, including controls for operating the changer mechanism, may be positioned at a remote location from the unit 10. Such control may be provided by connection of wiring from a remote control unit (not shown) to a connector 66. When the unit 10 has been energized, a tape cartridge 23 is next positioned in the slot 25 of the player 11. The tape will play through the end of its second program, then a signal generated in response to a code at the end of the tape will be sent to the release solenoid 13 to release the tape cartridge 23 from the capstan, pressure roller and head, 15a, 15b and 15c, respectively (see FIG. 5). The cartridge 23 is thus dropped into the empty storage cell 20. At the same time the releasing solenoid 13 is activated, a message is also sent to the circuit board 60 to activate the storage unit advancing mechanism 24. Thus, after the tape cartridge 23 has returned to its storage cell 20 in the unit 19, the unit 19 is advanced to the left or right.

When the next storage cell 20 and cartridge 23 have reached the position below the receiving slot 25 of the tape player 11, the cartridge lifting mechanism 26 is activated to raise the cartridge 23 into the player 11. See FIGS. 2 through 5. As shown in FIGS. 3 and 5, the lifting mechanism 26 and advancing mechanism 24 act from the same position along the tracks 17 and 18 of the unit 10, i.e., at the location of the tape player receiving slot 25. As the tape 23 is raised into position in the tape player 11 (FIG. 5), the mechanism 15 of the player snaps into position to engage the tape between the pressure roller 15b and drive capstan 15a and to hold the tape against the head 15c of the player. The lifter solenoid 28 is de-energized, and the lifting arm 36 drops back to its rest position shown in FIG. 3.

As discussed above, the continuous loop tape of the cartridge 23 is played through its first program, then, begins to play the second program. It should be appreciated that if a standard 8-track system is employed in the unit 11, the tape cartridges 23 being standard 8-track cartridges, the head and tape drive system would be arranged differently but the apparatus 10 would nonetheless function in the same manner. An 8-track tape cartridge would normally play through four program loops rather than two.

The tape cartridge storage unit 19 advances cell-by-cell as successive tape cartridges 23 are played and returned to the unit 19. When the unit 19 reaches the last cartridge to one end of the row of tapes 23 stored in the unit 19, the limit switch 55 (FIG. 1) mounted on the frame 16 is tripped by an appropriately located ramp on the projection 22 of the storage unit 19 so that after the last cartridge has been played and returned to the storage unit 19, the advancing mechanism 24 is reversed to advance the unit 19, cartridge-by-cartridge, in the opposite direction. The direction of advancement of the unit 19 is again reversed when its opposite end has reached the playing position, through the tripping of another limit switch 55 located at the opposite end of the frame 16.

At any time during the playing of one of the tapes 23, a reject signal may release the cartridge from the player 11 to drop it into the unit 19, and the unit 19 will be advanced to the next cartridge. The following tape cartridge is then played, and the unit 19 continues to travel in the direction in which it was advanced.

If the position reading apparatus 53 is included in the apparatus 10, as discussed above, then the normal pattern of advancement of the storage unit 19 can be over-ridden by the operator's selection of a particular cartridge at any time. Alternatively, in another embodiment, the apparatus 10 includes only the position reading and selecting apparatus, without provision for sequential tape progression in the absence of instructions from the selector device. In this embodiment, after the playing and release of a tape cartridge 23, the storage unit 19 does not advance in either direction, but awaits instructions from the selector device.

An important feature of the tape cartridge playing and changing apparatus 10 of the invention is its compact, modular-type assembly. As best seen in FIGS. 1 and 4, the tape player housing 10a is a module, slidable into and out of channels defined by flanges 68 on the frame 16. Thus, the player housing 10a can be easily removed for maintenance and replaced, if necessary. The control unit 12 behind the player housing 10a comprises another module, being slidable under the flanges 68 into engagement with the player housing 10a as shown in FIG. 1. A pair of screws 69 engage bracket arms 71 to retain the two modules together, and a transverse channel 72 passing through an interception in the flanges 68 prevents the modules from sliding once they have been assembled. The channel 72 also serves to isolate the solenoids from imposing undesired signals to the player amplifier and logic systems. The channel 72, which is held by a fastener 73 to the frame 16 as shown in FIG. 5, is easily removed after the control module 12 has been removed. In addition to its function as an assembly component, the channel 72 also serves as a conduit for electrical wiring (not shown) which passes through the width of the assembly 10 from the advancing and lifting mechanisms 24 and 26 and from the limit switches 55 to the circuit board 60.

Figure 7:
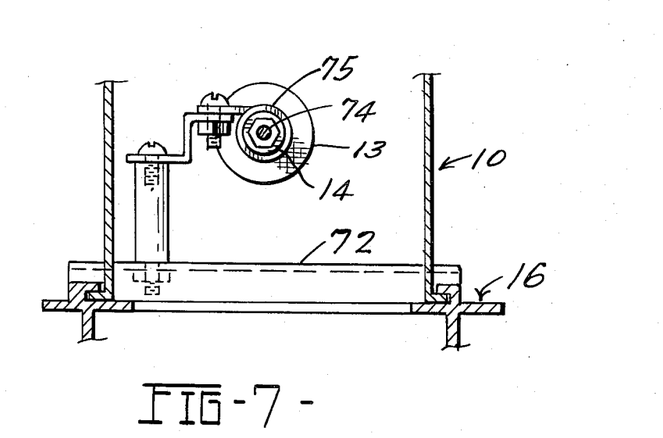
FIG. 7 is a fragmentary, enlarged sectional view taken along the line 7—7 of FIG. 5.

When the player and control modules 10a and 12 are disassembled from one another, the solenoid plunger 14 is pulled out of the solenoid 13 and remains connected from the release mechanism 15 of the player housing 10a by means of a linkage clip 74, seen in FIGS. 1 and 5. When the two modules 10a and 12 are to be reassembled, the plunger 14 must be re-inserted into the solenoid 13. This otherwise difficult operation is facilitated by a pilot sleeve 75 (see FIG. 7) connected to the frame 16, for receiving the plunger 14 while the two modules are still widely separated. The pilot sleeve 75, preferably of nylon or other non-magnetic material, then guides the plunger 14 into the solenoid 13 as the two modules 10a and 12 are brought together for assembly.

The circuit board 60 is itself a module of the assembly 10. As shown in FIGS. 1 and 4, flanges 76 on the frame 16 slidably retain the circuit board 60. In its assembled position, the circuit board makes connection with appropriate wiring leading to the various components of the assembly. In the event of malfunction, the circuit board 60 is readily replaced.

Also comprising a modular unit are the advancing and lifting mechanisms 24 and 26. As seen in FIGS. 1 and 3, they are retained to the frame 16, via the housing section 39, by screws 77 and may be easily removed for servicing.

The tape cartridge storage unit 19, as described above, also forms a module of the assembly 10. It is slidable out of the frame 16, so that it can be replaced with a similar module containing different tape cartridges. Also, individual tape cartridges can be removed and replaced from the unit 19 while it is outside the frame 16, or while it is inside the frame by the flexing outward of the flexible retaining clips 49 to release cartridges from the bottom.

It has been found that the tape cartridge playing and changing assembly 10 provides a compact unit and solves many of the problems found in the prior art.

What I claim is:

1. A tape cartridge changing apparatus, comprising:
    a frame;
    a tape cartridge storage unit for retaining a plurality of tape cartridges; means on said storage unit and on said frame providing slidable movement of said storage unit through said frame; a tape player positioned on said frame above said slidable storage unit, said player having a cartridge-receiving slot disposed directly above said storage unit at a first location and adapted to receive, in tape-playing engagement, a tape cartridge lifted upwardly from said storage unit;
    means for lifting a tape cartridge positioned below such cartridge-receiving slot upwardly into the slot, said lifting means comprising a solenoid having a generally vertically reciprocable plunger, a lifting arm privoted on a generally horizontal axis and including a lifting end opposite the pivot axis adapted to contact a bottom surface of a tape cartridge in the storage unit, and connecting means extending from said plunger for raising said lifting arm in an arcuate path about said axis to lift a tape cartridge from said storage unit into the cartridge-receiving slot of said tape player; means for releasing a tape cartridge from the slot of the player, to drop the cartridge back into the storage unit; and
    means for slidably advancing the storage unit to position another tape cartridge in the storage unit adjacent such cartridge-receiving slot of the tape player.

2. The apparatus of claim 1 which further includes means connected to the advancing means for reversing the direction of advancement of said storage unit when the last tape cartridge at one end of the storage unit has been played.

3. The apparatus of claim 1 wherein said lifting means, said releasing means and said advancing means each includes a solenoid means.

4. The apparatus of claim 1 wherein said lifting end of said lifting arm is curvedly shaped such that as it moves upward in lifting the tape cartridge, it continues to make contact with the approximate center of the cartridge bottom surface.

5. The apparatus of claim 4 wherein said plunger is rotatable within the solenoid and said connecting means comprises a rod extending generally vertically from the plunger for linear travel therewith and having a bend near its end opposite said plunger defining a swingable end portion, said lifting arm including means receiving said swingable end portion with said swingable end portion in swingable supportive engagement therewith.

6. The apparatus of claim 5 further including adjusting means for varying the length to which said rod extends from said plunger.

7. The apparatus of claim 6 wherein said adjusting means comprises a threaded connection between said plunger and said rod and a tightening nut on said rod for preventing relative rotation of said plunger and said rod, said plunger including a transverse bore for receiving a holding pin during adjustment of said rod.

8. A tape cartridge changing apparatus, comprising:
a frame;
a tape cartridge storage unit for retaining a plurality of tape cartridges; means on said storage unit and on said frame providing guided and slidable movement of said storage unit through said frame;
a tape player positioned on said frame above said slidable storage unit, said player having a cartridge-receiving position disposed directly above said storage unit at a first location and adapted to receive, in tape-playing engagement, a tape cartridge lifted upwardly from said storage unit; means for lifting a tape cartridge positioned below such cartridge-receiving slot upwardly into such cartridge-receiving position, said lifting means comprising a solenoid having a generally vertically reciprocable plunger, a lifting arm including a lifting end adapted to contact a bottom surface of a tape cartridge in the storage unit, and connecting means extending from said plunger for raising said lifting arm in an arcuate path to lift a tape cartridge from said storage unit into such cartridge-receiving position of said tape player;
means for releasing a tape cartridge from such cartridge-receiving position to drop the cartridge back into the storage unit; and
means for slidably advancing the storage unit to locate another tape cartridge in the storage unit beneath such cartridge-receiving position of the tape player.

9. The apparatus of claim 8 including means connected to said advancing means for reversing the direction of advancement of said storage unit when the last tape cartridge at one end of said storage unit has been played.

10. The apparatus of claim 8 wherein said lifting end of said lifting arm is curvedly shaped such that as it moves upward in lifting the tape cartridge, it continues to make contact with the approximate center of the cartridge bottom surface.

11. The apparatus of claim 8 wherein said tape player includes a cartridge releaser and said releasing means includes a solenoid having a reciprocable plunger, said plunger being linked to said cartridge releaser of said tape player, and a pilot sleeve normally circumjacent said plunger for receiving and guiding said plunger into said solenoid when said releasing means is assembled adjacent said tape player on said frame.

* * * * *

UNITED STATES PATENT OFFICE
CERTIFICATE OF CORRECTION

Patent No. 3,996,617          Dated Dec. 7, 1976

Inventor(s) Bernard A. Cousino

It is certified that error appears in the above-identified patent and that said Letters Patent are hereby corrected as shown below:

Column 1, line 63, "cartridges" should be deleted after to.

Column 3, line 63, "3,835,670" should be 3,885,670.

Signed and Sealed this

Fifteenth Day of February 1977

[SEAL]

Attest:

RUTH C. MASON
*Attesting Officer*

C. MARSHALL DANN
*Commissioner of Patents and Trademarks*